United States Patent [19]

You et al.

[11] Patent Number: 5,833,355
[45] Date of Patent: Nov. 10, 1998

[54] LED ILLUMINATED LAMP ASSEMBLY

[75] Inventors: Chenhua You, Manasquan; John M. Critelli, Point Pleasant; Yubo Yang, North Brunswick; Hyman Grossman, Lambertville, all of N.J.

[73] Assignee: Dialight Corporation, Manasquan, N.J.

[21] Appl. No.: 761,139

[22] Filed: Dec. 6, 1996

Related U.S. Application Data

[60] Provisional application Nos. 60/010,150 Jan. 17, 1996 and 60/024,028 Aug. 16, 1996.

[51] Int. Cl.$^6$ ........................................................ F21V 5/00
[52] U.S. Cl. ........................... 362/244; 362/336; 362/338; 362/800
[58] Field of Search ..................................... 362/234, 235, 362/242, 244, 330, 331, 335, 336, 338, 800

[56] References Cited

U.S. PATENT DOCUMENTS

| | | |
|---|---|---|
| 4,729,076 | 3/1988 | Masami et al. . |
| 4,733,335 | 3/1988 | Serizawa et al. . |
| 4,862,330 | 8/1989 | Machida et al. ........................ 362/244 |
| 5,515,253 | 5/1996 | Sjobom . |
| 5,528,474 | 6/1996 | Roney et al. . |

*Primary Examiner*—Stephen F. Husar
*Attorney, Agent, or Firm*—Oblon, Spivak, McClelland, Maier & Neustadt, P.C.

[57] ABSTRACT

The present invention provides for a lamp assembly which can be utilized in overhead signaling or lighting applications such as in traffic signal lamps or illuminated overhead road signs. The assembly includes a lens that optimizes and redirects light in a desirable direction in order to meet certain regulations. The lens of the present invention is designed to power portions of light emitted from an LED while allowing other portions to pass through the lens unaided. The lens of the present invention works in combination with specific LEDs to efficiently redirect light emitted from the LEDs. The assembly includes a circuit board including a plurality of rows of LEDs and the lens, which has an exterior surface and an interior surface. The interior surface of the lens comprises a plurality of rows of horizontal bands with a single band being associated with a row of the LEDs. Each of the bands has an upper region and a lower region used to redirect some light rays downward, allow some rays to travel uninterrupted and redirect some light horizontally.

11 Claims, 9 Drawing Sheets

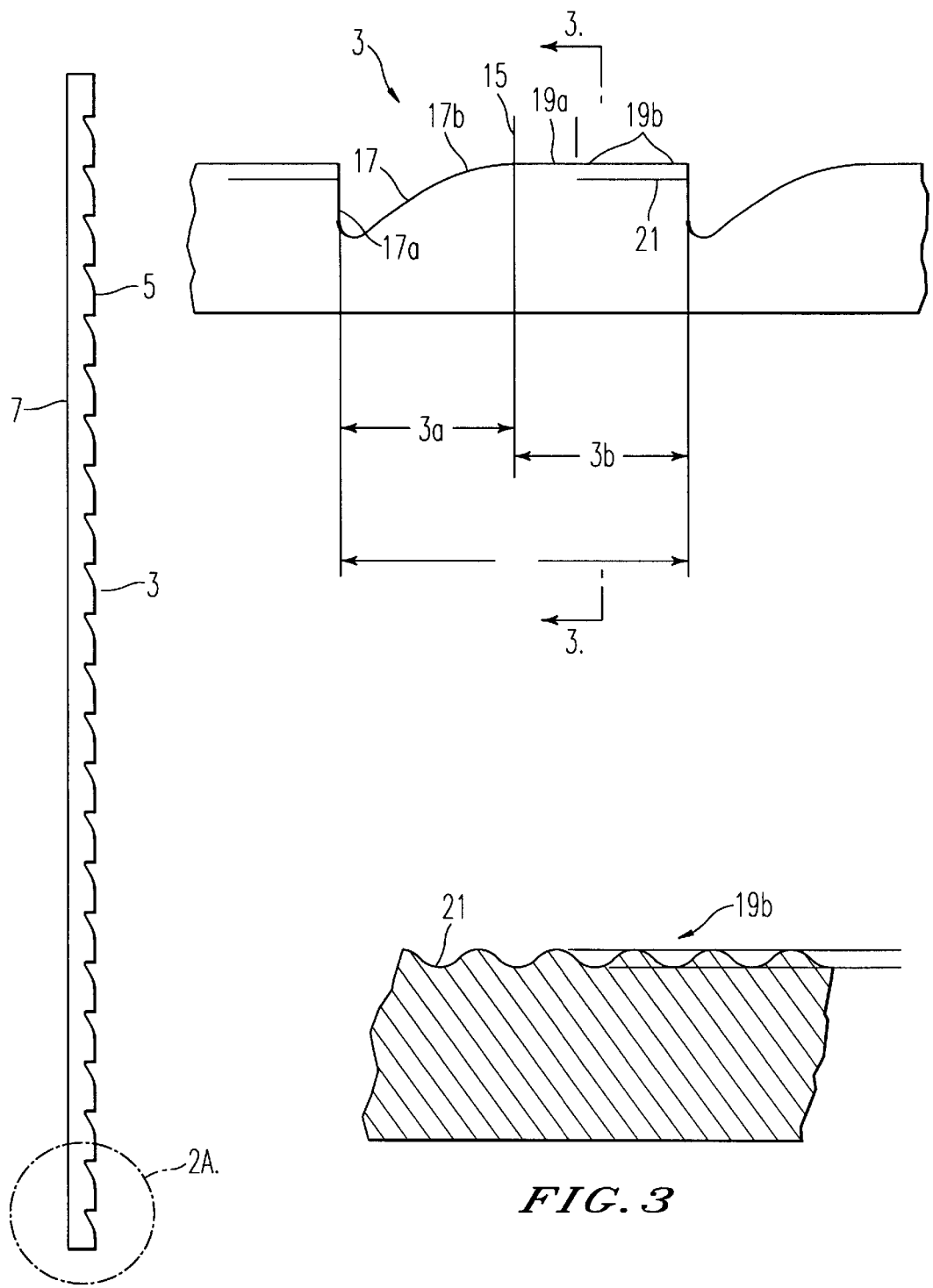

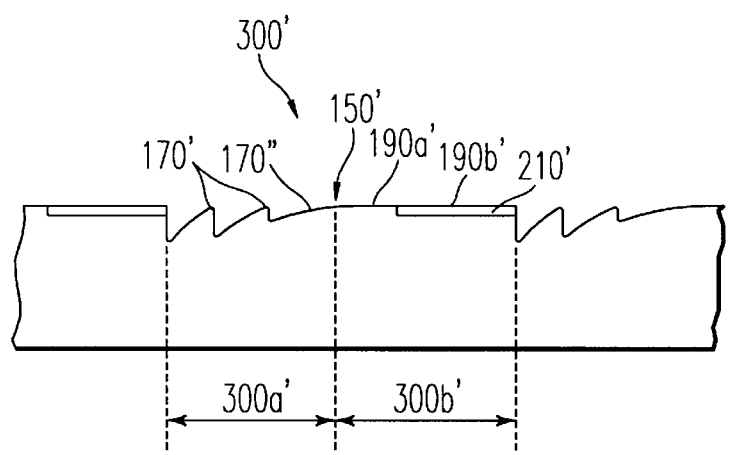
FIG. 10
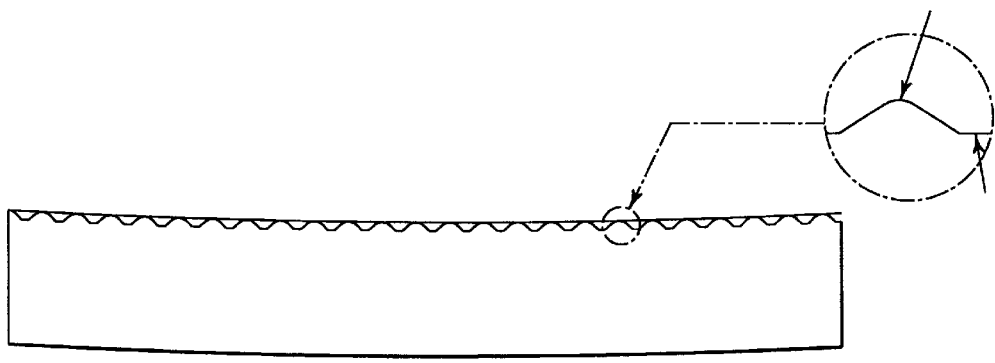
FIG. 11B
FIG. 11A

LED ILLUMINATED LAMP ASSEMBLY

This application is based on provisional U.S. application Ser. No. 60/010,150, filed on Jan. 17, 1996, and provisional U.S. application Ser. No. 60/024,028, filed on Aug. 16, 1996, and claims priority on both these U.S. provisional applications.

BACKGROUND OF THE INVENTION

The present invention relates to an LED (light emitting diode) illuminated lamp assembly which can be utilized in overhead signaling or lighting applications such as in traffic signal lamps or overhead illuminated road signs. The assembly is designed to work in combination with an optically powered lens to efficiently redirect light emitted from an LED or a collection of LEDs to specific angles.

DISCUSSION OF THE RELATED ART

Conventional traffic signal lamps or illuminated overhead road signs which utilize incandescent lamps have drawbacks which are related to the use of incandescent lamps. Conventional traffic signal lamps are also equipped with lenses which are generally designed to accept essentially parallel rays of light from a parabolic reflector. Generally, incandescent lamps require much greater power and burn out more frequently than LEDs. Thus, incandescent lamps require more frequent replacement. LEDs offer a desirable reduction in operation and maintenance costs when compared to incandescent lamps.

With recent advances in LED efficiency, it has become practical to offer exterior lighting products which employ LEDs. However, there are different issues to consider when using LEDs where incandescent lamps have historically been used. First, conventional LEDs emit light in a relatively tight radiation pattern that requires the redistribution of that light in order to attain spatial distributions in compliance with, for example, Institute of Transportation Engineers (ITE) requirements or other regulations. Also, LEDs are heat-sensitive devices and, therefore, heat generated during operation of the LEDs and associated components must be low enough (or dissipated adequately) to assure a reliable operation over extreme temperature ranges.

A first related LED assembly is disclosed in U.S. Pat. No. 5,174,649 which describes a lamp assembly that utilizes a two-surface lens (with an incident surface having hyperboloids and an exit surface having facets). The hyperboloids of this arrangement translate the LED rays to substantially parallel beams and the facets spread the light out to a desired pattern. However, this design has drawbacks in that it includes a proclivity toward the collection of dirt, oil, ice and other debris which interfere with the light output when used in exterior lighting applications.

A second related assembly involves a lamp which employs LEDs arranged in concentric circles with a non-powered lens (i.e., having no lens details). Light emitted from this arrangement produces a symmetrical light distribution. When used in traffic signal applications (where light is only of value below a horizontal axis), this approach is not as efficient as that used in the lamp assembly of the present invention.

A third product is disclosed in U.S. Pat. No. 5,343,330. In this arrangement, the assembly is comprised of a lens containing individual "pockets" into which LEDs are inserted. Because these LEDs are inserted into a curved lens, use of a printed wiring board is neither practical nor used. In this product, the LEDs are wired to each other, complicating the assembly or repair methods. The lens features of this product are all on the internal surface.

A further known product is an Electrotech product (Model #33200G2). In this arrangement, the lamp assembly employs LEDs of distinctly different viewing angles to produce symmetrical light. Also, a non-powered lens is utilized with this product. This approach has disadvantages with respect to symmetrical light used in an application where symmetry is not useful. It also provides non-uniform lighting, to give it the appearance of only partial illumination when viewed from different angles.

SUMMARY OF THE INVENTION

Accordingly, an object of the present invention is to provide for an LED illuminated lamp assembly which overcomes the drawbacks of the related products noted above.

The lens of the present invention is designed to work in combination with specified LEDs to efficiently redirect light emitted from each LED (or collection of LEDs) to specific angles. This provides for a uniformly-illuminated lens in which light emitted through the lens provides for an appearance of full illumination.

A further object of the present invention is to provide for a lens which can redirect non-parallel rays from multiple LEDs.

A further object of the present invention is to provide for a lamp assembly which incorporates a flat printed wiring board which is suitable for LED insertion with generally-available electronic assembly methods.

A further object of the present invention is to provide for a lens with a smooth exterior surface which minimizes the collection of dirt and debris when used in an exterior lighting application.

A further object of the present invention is to provide for a lens assembly which maximizes light efficiency emitted by a minimal amount of LEDs to meet ITE specifications or other regulations.

Accordingly, the present invention provides for an LED illuminated lamp assembly which comprises a circuit board assembly having a plurality of rows of LEDs; and a lens having an interior surface and an exterior surface. The interior surface of the lens comprises a plurality of horizontal bands with a single band being associated with a row of the LEDs. Each of the bands has an upper region and a lower region serving to redirect certain light rays and allow other rays to travel uninterrupted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1B shows a side view of the lens assembly of FIG. 1A;

FIG. 2A illustrates detail B—B of the lens feature of FIG. 1B;

FIG. 3 illustrates section 3—3 of the lens feature of FIG. 2A;

FIG. 10 illustrates a further modification for detail C of the lens feature of FIG. 7; and FIG. 11 shows section 11—11 from FIG. 7.

DESCRIPTION OF THE PREFERRED EMBODIMENTS

Figure 1A:
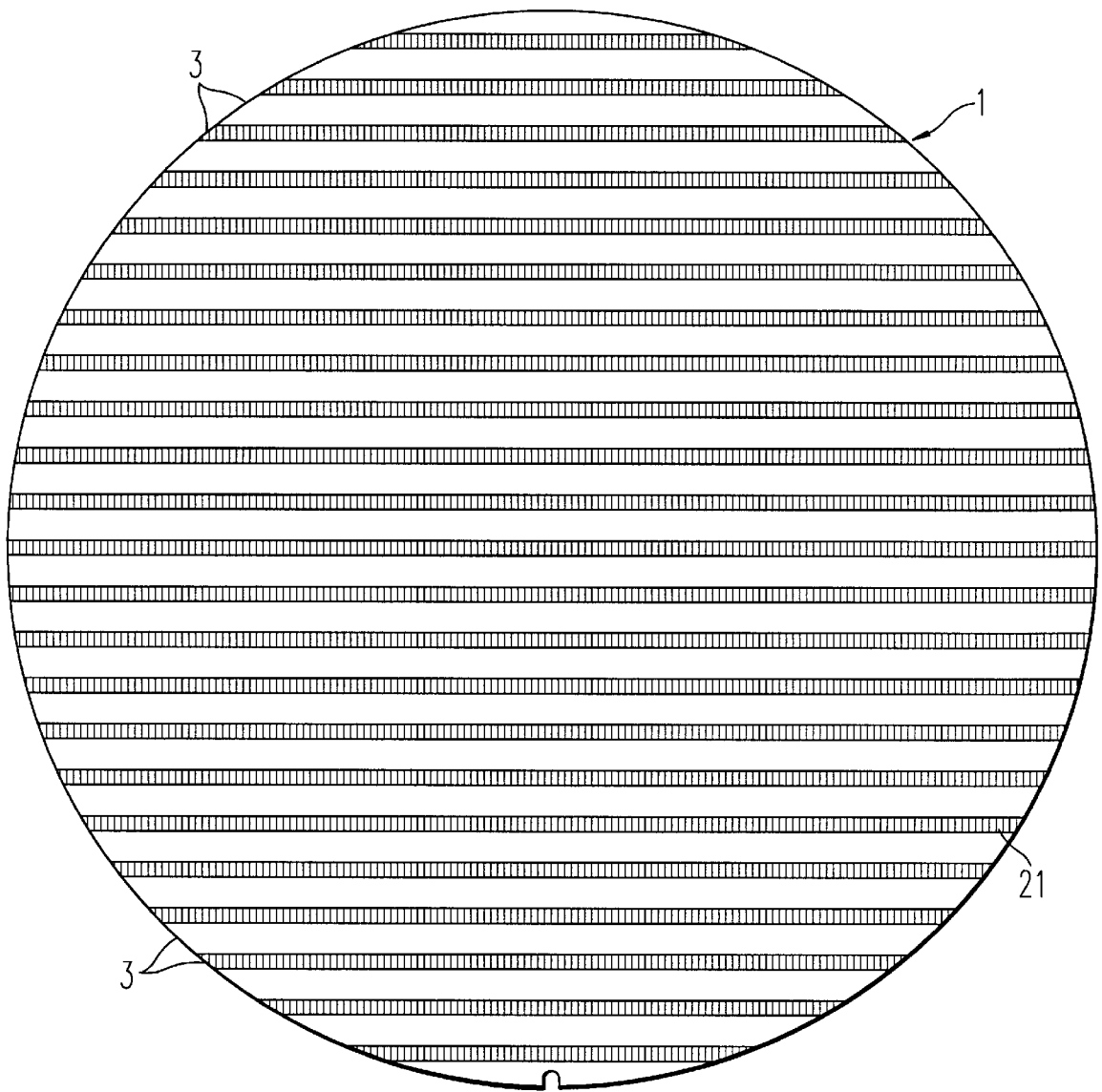
FIG. 1A shows a front view of the lens of the present invention.

Referring now to the drawings, wherein like reference numerals designate identical or corresponding parts throughout the several views, and more particularly to FIGS. 1A and 1B, in these figures a front view and side view of the lens 1 are respectively shown. As illustrated in FIGS. 1A and 1B, the lens 1 includes a plurality of horizontal bands 3 which extend along the width of the lens 1.

As illustrated in FIG. 1B, the lens 1 can include an interior surface 5 which includes the horizontal bands 3, and a smooth exterior surface 7. The smooth exterior surface 7 minimizes the collection of dirt and debris on the lens when the lens is used in an overhead exterior lighting or signaling application such as in a traffic signal lamp or an overhead illuminated road sign. Only the interior surface 5 includes the optical details of the horizontal bands 3.

Figure 4A:
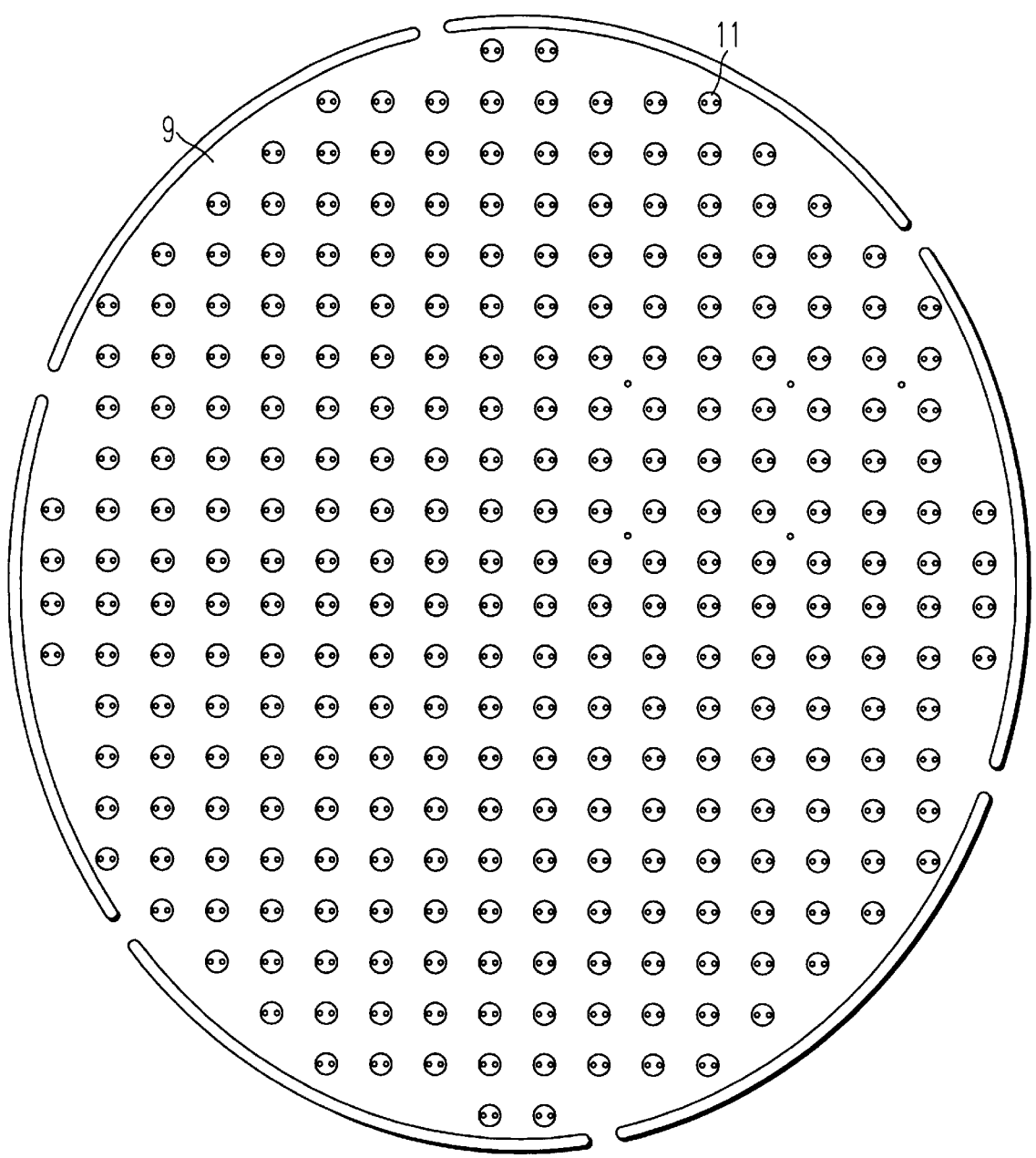
FIG. 4A illustrates a circuit board assembly which can be utilized with the lens of the present invention.
Figure 4B:
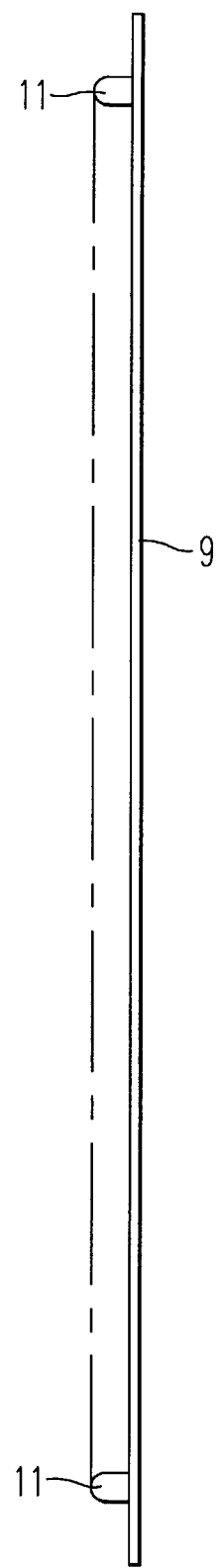
FIG. 4B is a side view of FIG. 4A.

The lens 1 of the present invention can be mounted over a circuit board assembly 9 as illustrated in FIGS. 4A and 4B. As shown in FIGS. 4A and 4B, the circuit board assembly 9 includes a plurality of longitudinal rows of LEDs 11 which are spatially positioned on the circuit board assembly 9.

Referring now to the horizontal bands 3 of the lens 1, each of the horizontal bands 3 includes an upper region 3a and a lower region 3b (see FIG. 2A). Details of the upper region and lower region 3a, 3b of the horizontal band 3 can be seen in FIG. 2A which shows detail B—B of FIG. 1B.

As illustrated in FIG. 2A, each of the horizontal bands 3 includes a line 15 between the upper region 3a and the lower region 3b. The line 15 can be on an optical axis of an associated LED 11, or the LEDs 11 can be located behind the horizontal bands 3 but not centered behind the horizontal bands 3.

Further with respect to FIG. 2A, the upper region 3a of the horizontal band 3 includes a complex surface 17 which can include a first substantially linear surface 17a and a curved surface 17b. Thus, the upper region 3a including the complex surface 17 having the linear surface 17a and the curved surface 17b tends to refract light rays that are headed upward, downward, in precise desirable directions which are preferable for traffic signal lamps in which lighting below the horizontal axis is desired. Thus, there is only vertical optical power created from this region of the band.

The lower region 3b of the band 3 is comprised of two parts (19a, 19b). The first part 19a is adjacent to the line 15. This first part 19a is a planar or substantially planar window that permits light from the LEDs to pass through as emitted from the LED. The second part 19b is positioned between the first part 19a and an upper half of an adjacent horizontal band. The second part 19b defines an array of precisely designed vertical grooves 21 which extend from the first part 19a in a linear manner and span along the entire width of each band. The vertical grooves 21 refract light to a desirable horizontal direction and can be seen in detail in FIG. 3.

Figure 6:
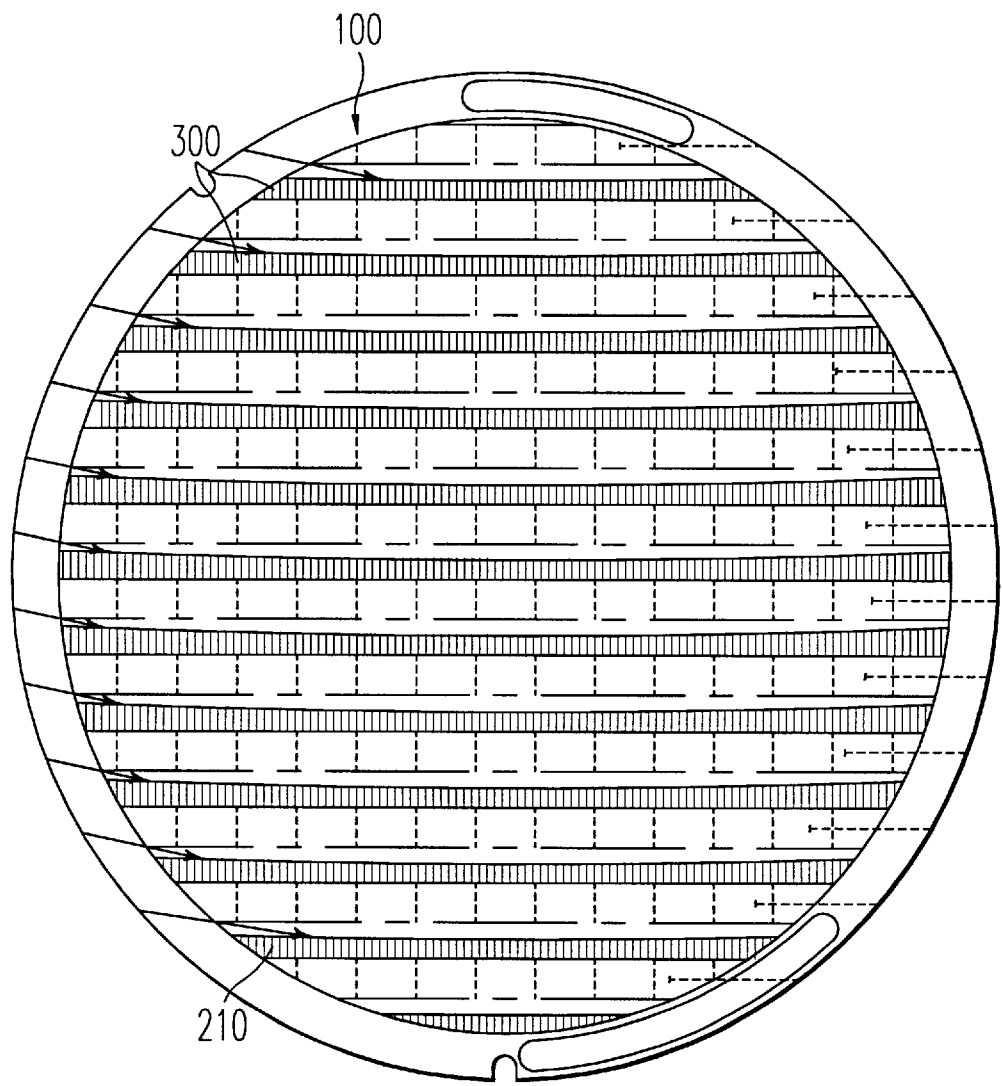
FIG. 6 is a front view of a lens of a further embodiment in which the lens is a dome shaped lens.
Figure 7:
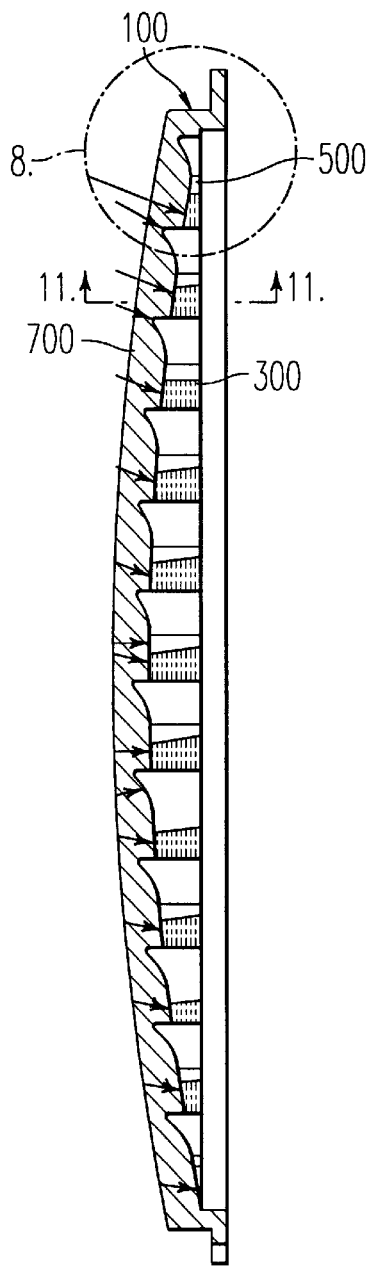
FIG. 7 is a side view of the lens of FIG. 6.

The lens 1 of FIG. 1 can have a flat configuration as shown in FIG. 1B. It is also recognized that the lens can be a dome shaped lens having a curvature as illustrated in FIGS. 6 and 7. As illustrated in FIG. 6, in the same manner as FIG. 1, the lens 100 of FIG. 6 can include a plurality of horizontal bands 300 which extend along the width of the lens 100. As shown in FIG. 7, the lens 100 can be a dome shaped lens having a curvature and can include an interior surface 500 which includes the horizontal bands 300, and a smooth exterior dome surface 700. As in the previous embodiment, the smooth exterior dome surface 700 minimizes the collection of dirt and debris on the lens when the lens 100 is used in an overhead exterior lighting or a signalling application such as in a traffic signal lamp or an overhead illuminated road sign. Only the interior surface 500 includes the optical details of the horizontal bands 300.

The lens 100 of FIGS. 6 and 7 can be mounted over a circuit board assembly 9 as illustrated in FIGS. 4A and 4B in the same manner as the first embodiment.

Figure 8:
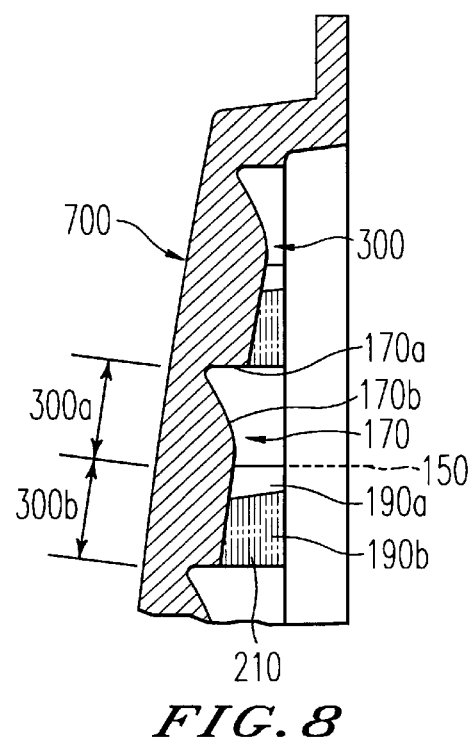
FIG. 8 shows detail C of FIG. 7.
Figure 9:
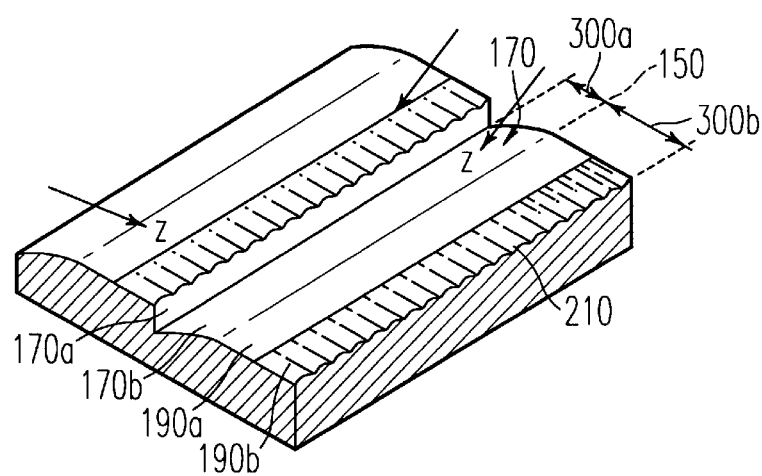
FIG. 9 is a perspective of the lens detail of FIG. 7.

The details of the horizontal bands 300 of FIGS. 6 and 7 is illustrated in FIG. 8 which shows detail C of FIG. 7, as well as FIG. 9 which is a perspective view along line 9—9 of FIG. 7. Each of the horizontal bands 300 can include an upper region and lower region 300a, 300b as illustrated in FIGS. 8 and 9. As in the first embodiment, the band 300 can include a line 150 between the upper region 300a and the lower region 300b. The line 150 can be an optical axis of an associated LED 11 or the LEDs 11 can be located behind the horizontal bands 300 but not centered behind the horizontal bands 300 as in the previous embodiment.

The upper region 300a of FIGS. 8 and 9 can include a complex surface 170 which includes a first surface 170a and a generally curved second surface 170b. The lower region 300b can include a first part 190a which can be generally curved and a second part 190b which includes an array of vertical grooves 210 which extend from the first part 190a and expand along the entire width of each band 300. The vertical grooves 210 can refract some light to a desired horizontal direction. Thus, the first part 190a that defines a slightly curved surface permits some light from the LEDs to pass therethrough. The second part 190b which includes the vertical grooves 210 can direct some light from the LEDs in a horizontal direction.

FIG. 10 shows a modification of detail C of FIG. 7. As shown in FIG. 10, each of the horizontal bands 300' can include an upper region and lower region 300a', 300b'.

As further illustrated in FIG. 10, each of the horizontal bands 300' includes a line 150' between the upper region 300a' and the lower region 300b'. The line 150' can be on an optical axis of an associate LED 11 or the LEDs 11 can be located behind the horizontal bands 300 but not centered behind the horizontal bands 300 as in the previous embodiments.

Further with respect to FIG. 10, the upper region 300a' of the horizontal band 300' can include at least one complex surface 170' in the form of pointed ridges or grooves, and optionally a slightly curved surface 170". Therefore, the upper region 300a' including the at least one complex surface 170' and the sightly curved surface 170'" noted above tends to refract light that is headed upward, downward, in precise desirable directions which are preferable for traffic signal lamps in which lighting below the horizontal axis is desired.

The lower region 300b' of the band 300' can include a first part 190a' which defines a surface which can be a slightly curved surface, and a second part 190b' which defines an array of vertical grooves 210' which extend from the first part 190a' and span along the entire width of each band 300'. The vertical grooves 210' refract light to a desirable horizontal direction.

Therefore, the first part 190a' that defines a slightly curved surface permits some light from the LEDs to pass therethrough. The second part 190b' which includes the vertical grooves 210' can direct some light from the LEDs in a horizontal direction.

The vertical grooves 210 or 210' like the grooves 21 of the first embodiment refract light to a desirable horizontal direction and can be seen in detail in FIG. 11.

Figure 2B:
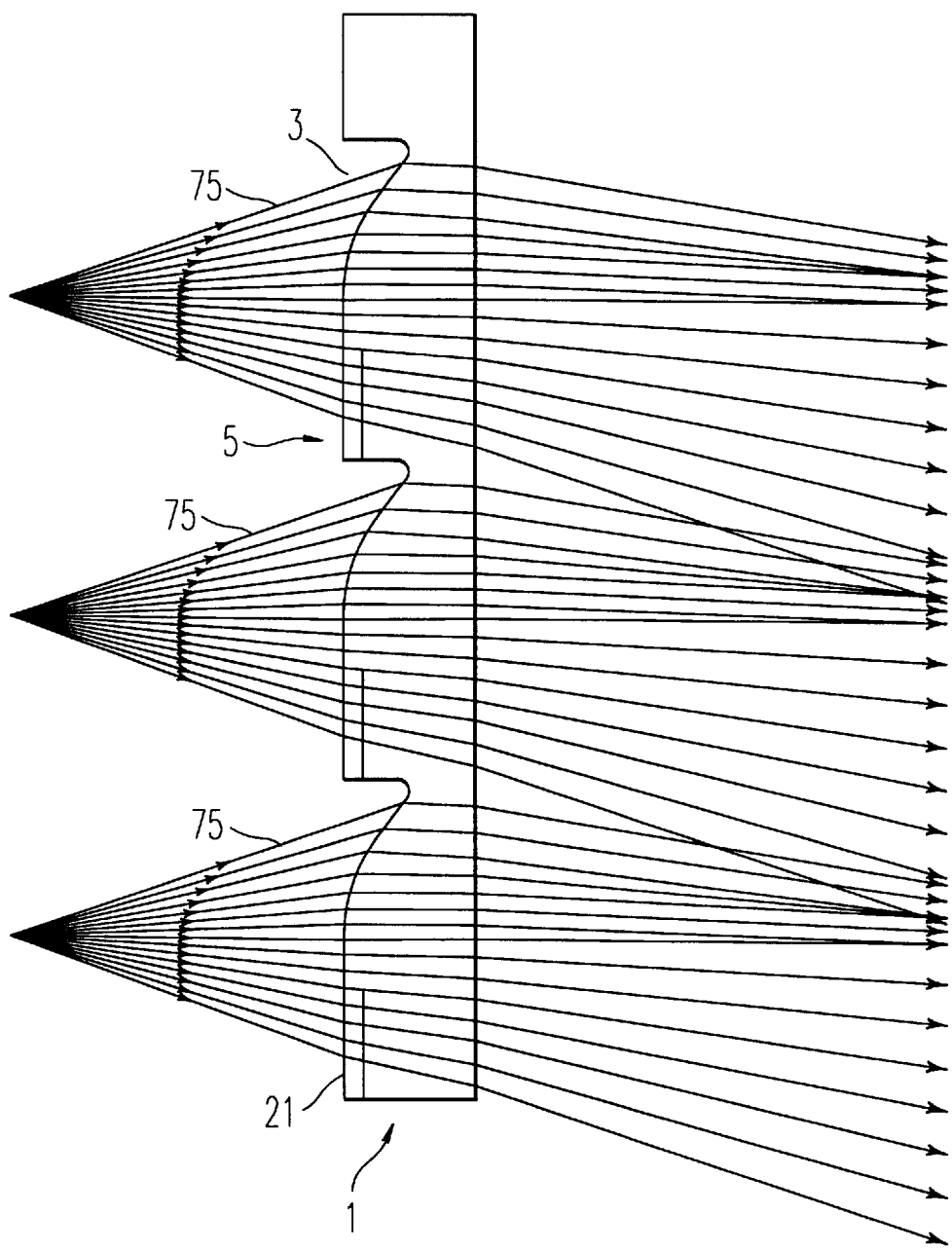
FIG. 2B illustrates the redirection of light from multiple LEDs utilizing the lens of the present invention.

Accordingly, the lens 1 of the present invention can optimize and redirect LED light in a desirable direction in order to meet, for example, ITE specifications as illustrated in the light ray diagram of FIG. 2B. As shown in FIG. 2B, the lens 1 of the present invention can redirect non-parallel rays 75 from multiple LEDs. The lens 1 is designed to refract portions of light emitted from an LED while allowing other portions to pass through the lens unchanged. The redirected LED light is optimized for compliance with regulations. The same applies for the lens 100 illustrated in FIGS. 6 and 10.

Referring now to FIG. 4A, as noted above, the LEDs 11 are arranged in rows so as to correspond with the horizontal bands 3 or 300 of the lens 1 or 100 when the lens 1 or 100 is mounted in front of the circuit board assembly 9. Each of the LEDs 11 has an optical axis which can be on the line 15 between the upper region and the lower region 3a, 3b of the horizontal bands 3. A side view of some LEDs 11 as mounted on the circuit board assembly 9 can be seen in FIG. 4B.

Figure 5:
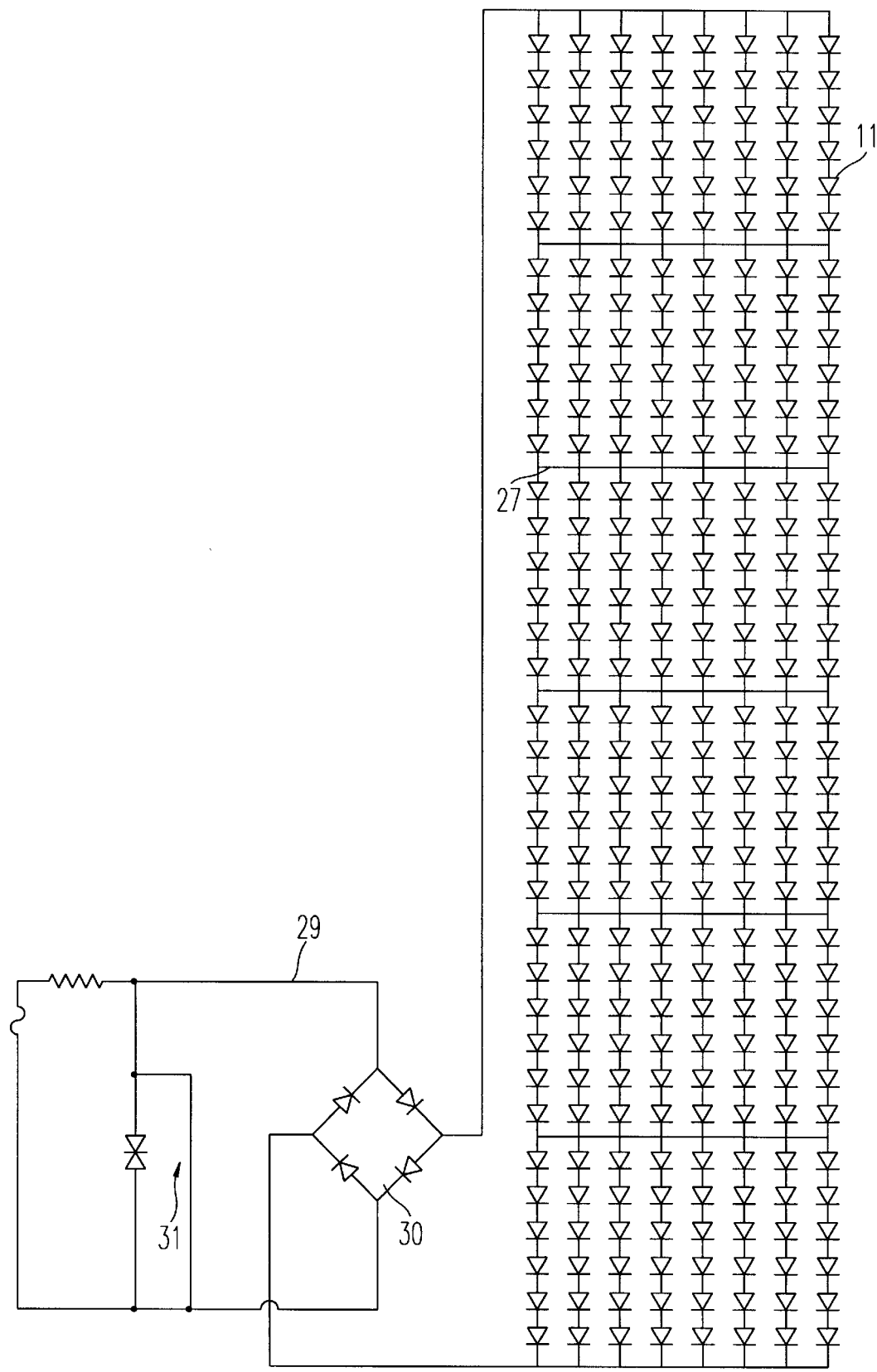
FIG. 5 illustrates a circuit diagram which can be utilized for the lens of the present invention.

Referring now to FIG. 5, the LED control circuit will now be explained. The lamp assembly of the present invention can utilize, for example, AlInGaP LEDs to produce the requisite amount of light. It is recognized that the amount and types of LEDs, utilized can be based on design considerations. As illustrated in FIG. 5, the circuit can include eight strings of thirty-six LEDs each. Each string can have cross-linked connections 27 at every sixth LED. Advantages of this arrangement are that if a single LED fails open, the cross-linking will prevent all but six LEDs (2%) from shutting down. The current through each of the remaining seven string segments will increase by only 14%. This value can be sustained indefinitely. Additionally, cross-linking blocks of six LEDs reduces the amount of "current hogging" caused by variation in forward voltage of the LEDs when compared to cross-linking of single LEDs.

The LEDs can be energized by power from a 120-volt AC line through an 8.2 $\mu$F capacitor 29 followed by a full wave bridge rectifier circuit 30 formed by four 1N4004 diodes. Current flows bi-directionally through the capacitor at every line cycle but uni-directionally through the LEDs due to the full wave rectifying action of the bridge circuit. The capacitor therefore acts as the series current limiting element, but instead of dissipating power, it temporarily stores it and later returns it to the line.

The advantages of this arrangement are that a substantial power can be saved compared to resistive current limiting schemes. This results in the production of less heat. Also, this approach permits the use of more parallel strings of fewer series-connected LEDs. This reduces the intensity variation of the lamp as line voltages varies, without the cost and complexity of a voltage regulator.

A second capacitor 31 (1.0 $\mu$F, 400 VDC) can be placed across the AC line and prevents leakage currents that may be present in solid-state switches, from causing the LEDs to glow in the off-state. This capacitor also prevents conflict monitors from mistaking the LED signal for a burned-out incandescent lamp. Surge protection is provided by a bidirectional 1.5K Joule transient voltage suppressor diode and a low resistance (2$\Omega$, 5 watt) resistor. A 2 amp fuse limits power to the assembly in the event of catastrophic failure. As noted above, the values given with respect to FIG. 5 are examples and can be based on design considerations.

Therefore, the lens 1 or 100 and circuit board arrangement 9 of the present invention can provide for a combination in which the lens maximizes light efficiency emitted from a nominal amount of LEDs to meet various regulations. The lens can direct light vertically downward through specific angles and the grooved features of the lens which are placed on specific areas of the lens can collect otherwise extraneous light and redirect this light horizontally. The lens is designed to work in combination with specified LEDs to efficiently redirect light emitted from the LEDs to specific angles. The lamp assembly incorporates a flat wiring board which is suitable for LED insertion and the backlit lens provides an appearance of full illumination. This is advantageous with respect to the use of the lamp assembly as an overhead signaling or lighting assembly such as a traffic signal lamp or an overhead illuminated road sign.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the U.S. is:

1. An LED illuminated lamp assembly comprising:
   (a) a circuit board assembly comprising a plurality of rows of LEDs; and
   (b) a lens having a first surface and a second surface, the first surface of the lens comprising a plurality of horizontal bands with a single band being associated with a row of LEDs, each of the bands having an upper region and a lower region, behind which bands the LEDs are located;

wherein:

(c) the upper region of each of said plurality of horizontal bands comprises at least one complex surface that refracts some light from the LEDs downward;
   (d) the lower region of each of said plurality of horizontal bands comprises:
      (i) a first part adjacent to the upper region which defines a surface that permits some light from the LEDs to pass therethrough and
      (ii) a second part positioned between the first part of the lower region and the upper region of an adjacent horizontal band which defines vertical grooves that extend along a width of each horizontal band; and
   (e) said vertical grooves direct some light from said LEDs in a horizontal direction.

2. An assembly according to claim 1, wherein said lens has a flat shape.

3. An assembly according to claim 1, wherein said lens is a dome shaped lens having a curvature.

4. An assembly according to claim 1, wherein the first surface of the lens is an interior surface.

5. An assembly according to claim 1, wherein the second surface of the lens is an exterior surface which is smooth to reduce collection of dirt and debris on the exterior surface.

6. An LED illuminated lamp assembly comprising:
 (a) a circuit board assembly comprising a plurality of rows of LEDs; and
 (b) a lens having a first surface and a second surface, the first surface of the lens comprising a plurality of horizontal bands with a single band being associated with a row of LEDs, each of the bands having an upper region and a lower region, behind which bands the LEDs are located;

wherein:
 (c) the upper region of each of said plurality of horizontal bands comprises a substantially linear surface and a curved surface free of vertical grooves; and
 (d) said upper region directs some upwardly directed light from the LEDs in a downward direction to increase the lighting below a horizontal axis of the lens.

7. An assembly according to claim 6, wherein:
 (a) the lower region of each of said plurality of horizontal bands comprises a surface which is substantially perpendicular to the linear surface of the upper region; and
 (b) a lower part of the lower region comprises a vertically grooved surface.

8. An assembly according to claim 6, wherein said lens has a flat shape.

9. An assembly according to claim 6, wherein said lens is a dome shaped lens having a curvature.

10. An assembly according to claim 6, wherein said the first surface of the lens is an interior surface.

11. An assembly according to claim 6, wherein the second surface of the lens is an exterior surface which is smooth to reduce collection of dirt and debris on the exterior surface.

* * * * *